(12) United States Patent
Shah et al.

(10) Patent No.: US 10,621,210 B2
(45) Date of Patent: Apr. 14, 2020

(54) RECOGNIZING UNKNOWN DATA OBJECTS

(71) Applicant: Amazon Technologies, Inc., Seattle, WA (US)

(72) Inventors: Mehul A. Shah, Saratoga, CA (US); George Steven McPherson, Seattle, WA (US); Prajakta Datta Damle, San Jose, CA (US); Gopinath Duddi, San Jose, CA (US); Anurag Windlass Gupta, Atherton View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 406 days.

(21) Appl. No.: 15/385,772

(22) Filed: Dec. 20, 2016

(65) Prior Publication Data
US 2018/0150548 A1    May 31, 2018

Related U.S. Application Data

(60) Provisional application No. 62/426,573, filed on Nov. 27, 2016.

(51) Int. Cl.
| | |
|---|---|
| *G06F 17/30* | (2006.01) |
| *G06F 16/28* | (2019.01) |
| *G06F 16/21* | (2019.01) |
| *G06F 16/13* | (2019.01) |
| *G06F 16/25* | (2019.01) |

(52) U.S. Cl.
CPC ......... *G06F 16/285* (2019.01); *G06F 16/13* (2019.01); *G06F 16/211* (2019.01); *G06F 16/254* (2019.01); *G06F 16/289* (2019.01)

(58) Field of Classification Search
None
See application file for complete search history.

(56) References Cited

U.S. PATENT DOCUMENTS

| | | | |
|---|---|---|---|
| 6,349,297 B1* | 2/2002 | Shaw | G06F 9/465 |
| 9,858,258 B1* | 1/2018 | Pasquini | G06F 17/2252 |
| 2009/0177671 A1 | 7/2009 | Pellegrini et al. | |
| 2009/0192979 A1 | 7/2009 | Lunde | |
| 2010/0274750 A1 | 10/2010 | Oltean et al. | |
| 2010/0290677 A1* | 11/2010 | Kwan | G06K 9/00228 382/118 |
| 2011/0071817 A1* | 3/2011 | Siivola | G06F 17/275 704/8 |

(Continued)

OTHER PUBLICATIONS

International Search Report and Written Opinion from PCT/US2017/063264, dated Jan. 19, 2018, Amazon Technologies, Inc., pp. 1-12.

(Continued)

*Primary Examiner* — Hung D Le
(74) *Attorney, Agent, or Firm* — Robert C. Kowert; Kowert, Hood, Munyon, Rankin & Goetzel, P.C.

(57) ABSTRACT

Recognizing unknown data objects may be implemented for data objects stored in a data store. Data objects that are identified as unknown may be accessed to retrieve a portion of the data object. Different representations of the data object may be generated for recognizing different data schemas. An analysis of the representations may be performed to identify a data schema for the unknown data object. The data schema may be stored in a metadata store for the unknown data object.

20 Claims, 9 Drawing Sheets

(56) References Cited

U.S. PATENT DOCUMENTS

| | | | | |
|---|---|---|---|---|
| 2013/0061133 A1* | 3/2013 | Naveh | ............... | G06F 17/2247 |
| | | | | 715/235 |
| 2014/0304600 A1* | 10/2014 | Chu | ............... | G06F 16/583 |
| | | | | 715/716 |
| 2015/0095290 A1* | 4/2015 | Saliba | ............... | G06F 16/252 |
| | | | | 707/674 |
| 2015/0100542 A1 | 4/2015 | Li et al. | | |
| 2015/0113009 A1 | 4/2015 | Zhou et al. | | |
| 2015/0286701 A1 | 10/2015 | Wideman | | |
| 2015/0347541 A1 | 12/2015 | Holmes et al. | | |
| 2016/0110340 A1* | 4/2016 | Bojja | ............... | G06F 17/275 |
| | | | | 704/9 |

OTHER PUBLICATIONS

Bratko, A. et al., "Exploiting Structural Information for semi-structured document categorization", Information Processing & Management, Dated May 1, 2006, vol. 42, No. 3, pp. 679-694.

Juan Trujillo et al., "A UML Based Approach for Modeling ETL Processes in data warehouses", In: Network and parallel computing, dated Oct. 16, 2003, pp. 1-14.

Anonymous, "Start informatica job when a row is updated", retrieved from URL: https://network.informatica.com/thread/13920. on Jan. 10, 2018. pp. 1-5.

Anonymous, "File based job trigger for deploying talend open studio jobs—Talend Community forum", Retrieved from URL: https//www.talendforge.org/forum/viewtopic.php?id=45580, retrieved on Jan. 10, 2018, pp. 1-3.

Oracle: "Triggers-Oracle Database Concepts", Retrieved from URL: https://Web.archive.org/web/20150918220843/hhttps://docs.oracle.com/cd/B19306_01/server.102/b14220/triggers.htm, retrieved on Jan. 11, 2018, pp. 1-17.

U.S. Appl. No. 15/385,777, filed Dec. 20, 2016, Mehul A. Shah et al.

* cited by examiner

RECOGNIZING UNKNOWN DATA OBJECTS

RELATED APPLICATIONS

This application claims benefit of priority to U.S. Provisional Application Ser. No. 62/426,573, entitled "Recognizing Unknown Data Objects," filed Nov. 27, 2016, and which is incorporated herein by reference in its entirety.

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data by introducing different file types that offer different processing or maintenance capabilities.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of recognizing unknown data objects are described herein. Increasing numbers of data storage and processing systems have encouraged a diverse set of file types, formats, or data schemas for storing data objects. Some data schemas, such as data schemas implemented in structured file types that store column oriented data, may be optimized for performing analysis over large ranges of data (e.g., in data warehouse applications which perform query processing over large ranges of column data), while other data schemas may be used for data stores that are better suited for processing large numbers of operations with low-latency (e.g., data schemas implemented in semi-structured data, such database tables maintained in non-relational data stores). Storing data objects according to different data schemas is not without cost when attempts are made to access data objects. For example, a data processing engine implemented as part of data warehouse cluster may execute queries against data objects stored in different column-oriented data schemas. In order to convert or adapt query processing for the different data schemas for the data objects, the data schemas of data objects may be needed in order to understand how the data objects are to be accessed. If, however, the data schemas of data objects are unknown then consumers of the data object, like the data warehouse application, may be blocked from accessing the unknown data objects.

Figure 1:
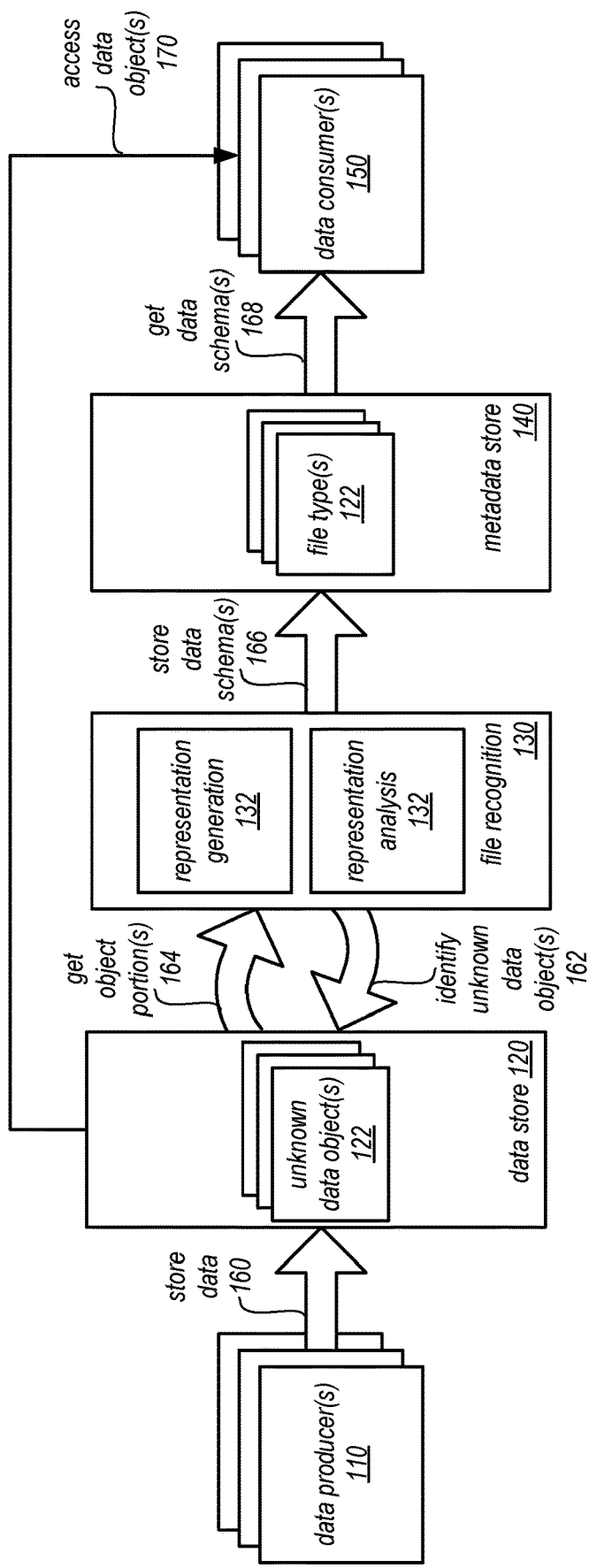
FIG. 1 illustrates a logical block diagram of recognizing unknown data objects, according to some embodiments.

Data schemas, including information describing the type, format, or structure of data in unknown data objects, may be recognized, in various embodiments, and stored in a metadata store. In this way, a diverse set of data consumer(s) can access, manipulate, or transform the unknown data objects to accomplish different objectives by retrieving the data schema from the metadata store in order to understand and access the unknown data objects. FIG. 1 illustrates a logical block diagram of recognizing unknown data objects, according to some embodiments. Different data producer(s) 110 may generate and store 160 data objects in data store 120. For example, data producer(s) 110 may be data collection or reporting systems for a wide variety of information, such as sales metrics, manufacturing control systems, retail inventory, website analytics data, or another data producer. Because data producers 110 generate a variety of information, the stored data objects 122 may be stored according to different, and possibly unknown, file types, formats, structures, data types, or other data schema information. For example, system performance logs for an online gaming platform may be stored in many different log file formats, while website analytics data may be stored in a semi-structured file type, like Comma Separate Values (CSV). Different data schemas may offer data producers 110 a diverse set of options for how data is generated or stored. As a result the possible number of data schemas that may be implemented or developed can proceed independently from data consumer(s) 150 that later access data stored in data store 120. For example, data producer(s) 110 may store sales data in one column-oriented file type that best suits the generation needs of data producer 110, while data consumer 150, which may execute queries over column-oriented data, may utilize a different column oriented file type that is optimized for the query execution techniques implemented by data consumer 150.

To provide data consumer(s) 150 with access to data objects that are in unknown data schemas, file recognition 130 of unknown data object(s) 122 may be implemented to detect or identify 162 unknown data object(s) 122, identify data schemas(s) 122 for the unknown data objects (including file types, data types or values of data stored within the unknown data object(s) 122, the structure, or lack thereof, of the unknown data object(s) 122, such as the number and/or types of columns, hierarchy of files, partitions or other objects within the unknown data object(s) 122), and store the data schema(s) 122 in a metadata store 140, which can be accessed by data consumer(s) 150. For example, file recognition 130 may detect unknown data object(s) 122 by scanning, searching, or crawling data store 120. Detection of unknown data object(s) 122 may be performed continuously, periodically or aperiodically, according to a schedule, or in response to an event that triggers the operation of the file recognition 130. As discussed below with regard to FIGS. 4 and 6, the identification of unknown data object(s) 122 may be performed as part of a file recognition task that is directed to search specified locations, in some embodiments. In another embodiment, file recognition 130 may identify unknown data object(s) 122 automatically without explicit task instructions. For example, file recognition 130 may poll access logs or other information for data store 120 indicating when new data objects are stored.

File recognition may get portions 164 of data objects (or the entire data objects), and generate 132 a representation of the portion for file recognition analysis. For example, as discussed below with regard to FIGS. 5A and 8, parsing techniques for different data schemas may be applied to generate a parsed result as the representation. The parsed result of the portion may then be evaluated as part of representation analysis 132 to determine if the parsed result is readable, understandable, or otherwise includes data schema information for accessing the unknown data object, indicating that the data schema corresponding to the parsing technique is the data schema of the unknown data object. Multiple different parsing techniques may be attempted in order to discover a parsed result that successfully interprets the portion of the unknown data object. In some embodiments, representation analysis may generate and compare confidence scores for the different representations (corresponding to different file data schemas) to identify the data schema for the unknown data object. In at least some embodiments, machine learning techniques to identify unknown data objects may be performed, such as those techniques discussed below with regard to FIGS. 5B and 8. For example, representation generation 132 may generate a multi-dimensional vector representing the portion of the unknown data object. A classification model may then be applied by representation analysis 132 according to machine learning technique like support vector machines to classify the vector as like a particular data schema.

File recognition 130 may then store data schema(s) 166 in metadata store 140. In this way, data consumer(s) 150 may get 168 the data schema(s) 122 in order to access 170 data objects 122. The identified data schemas for unknown data object(s) 122 may be organized or stored in tables as part of a database, in some embodiments, to provide query access over the data schemas for unknown data object(s) 122. For example, the data schemas for a large number of data objects may be stored in the database, allowing users to discover the contents of the large number of data objects without having to individually search the data objects directly. In this way, data objects that include desired information may be quickly identified. Data schema(s) may also be modified by users, stakeholders, or other entities in order to correct recognition mistakes or further refine the data schemas stored for unknown data objects.

Please note that the previous description of recognizing unknown data objects is a logical illustration and thus is not to be construed as limiting as to the implementation of a data store, metadata store, data producer(s), data consumer(s), or file recognition.

This specification begins with a general description of a provider network that implements a data catalog service that performs recognition of unknown data objects to generate and provides access to data catalogs for the unknown data objects. Then various examples of a data catalog service including different components/modules, or arrangements of components/module that may be employed as part of implementing the data catalog service are discussed. A number of different methods and techniques to implement recognizing unknown data objects are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
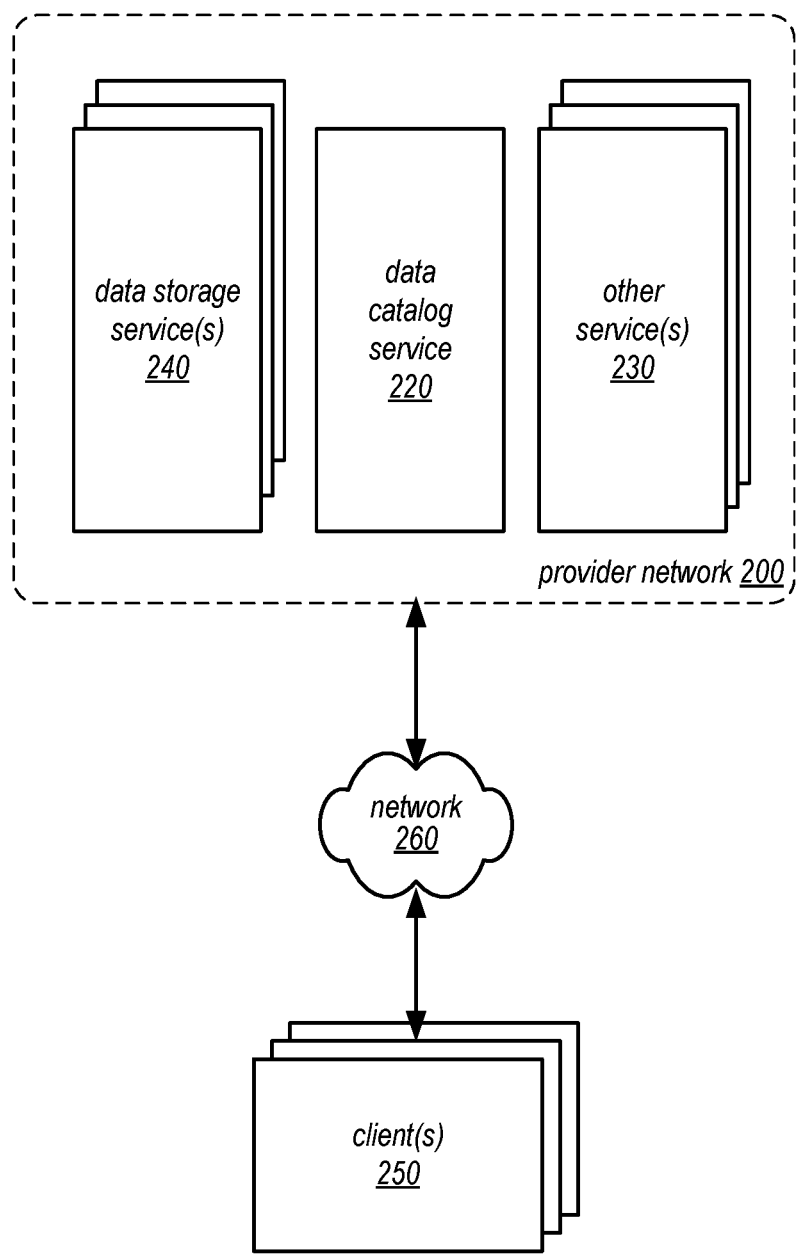
FIG. 2 is a block diagram illustrating a provider network offering different services including a data catalog service that performs recognition of unknown data objects, according to some embodiments.

FIG. 2 is a block diagram illustrating a provider network offering different services including a data catalog service that performs recognition of unknown data objects, according to some embodiments. Provider network 200 may be a private or closed system or may be set up by an entity such as a company or a public sector organization to provide one or more services (such as various types of cloud-based storage) accessible via the Internet and/or other networks to clients 250. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. In some embodiments, provider network 200 may implement various computing resources or services, such as a data storage service(s) 240 (e.g., object storage services, block-based storage services, or data warehouse storage services), data catalog service 220, as well as other service(s) 230, which may include a virtual compute service, an extraction transformation and loading (ETL) service, data processing service(s) (e.g., map reduce, data flow, and/or other large scale data processing techniques), and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given system or service component (e.g., a component of data storage service 230) may be implemented by a particular node or may be distributed across several nodes. In some embodiments, a given node may implement the functionality of more than one service system component (e.g., more than one data store component).

Data storage service(s) 240 may implement different types of data stores for storing, accessing, and managing data on behalf of clients 250 as a network-based service that enables clients 250 to operate a data storage system in a cloud or network computing environment. For example, data storage service(s) 240 may include various types of database storage services (both relational and non-relational) or data warehouses for storing, querying, and updating data. Such services may be enterprise-class database systems that are scalable and extensible. Queries may be directed to a database or data warehouse in data storage service(s) 240 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system.

Data storage service(s) 240 may also include various kinds of object or file data stores for putting, updating, and getting data objects or files, which may include data files of unknown file type, structure, values, or other form of data schema. Such data storage service(s) 240 may be accessed via programmatic interfaces (e.g., APIs) or graphical user interfaces. Data storage service(s) 240 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

Data catalog service 220 may provide a catalog service that locates, and identifies data stored on behalf of clients in provider network 200 across the various data storage services 240, as discussed in detail below with regard to FIG. 3. For example, a database stored in a non-relational database format may be identified along with container storing objects in an object-based data store as both being stored on behalf of a same customer of provider network 200. In at least some embodiments, data catalog service 220 may be configured to determine, recognize, identify, or extract the data schema of unknown data objects and direct the creation of a data catalog or other metadata storage structure that describes the data objects and includes the data schema.

Other service(s) 230 offered by provider network 200 may include an Extract, Transform, Load (ETL) service that provides extraction, transformation, and loading capabilities to place data into data sets at one or more of the various data storage service(s) 240. For example, the ETL service may provide clients with the resources to create, maintain, and orchestrate data loading jobs that take one or more data sets, perform various transformation operations, and store the transformed data for further processing (e.g., by one or more of data processing service(s)). The ETL service may access a data catalog generated by data catalog service 220 in order to perform an ETL operation (e.g., a job to convert a data object from one data schema into one or more other data objects of a different data schema).

Other service(s) 230 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage services 240. Various other distributed processing architectures and techniques may be implemented by data processing services (e.g., grid computing, sharding, distributed hashing, etc.). Note that in some embodiments, data processing operations may be implemented as part of data storage service(s) 240 (e.g., query engines processing requests for specified data). Data processing service(s) may be clients of data catalog service 220 in order to obtain file type and other metadata for data objects for performing various processing operations with respect to data sets stored in data storage service(s) 240.

Generally speaking, clients 250 may encompass any type of client configurable to submit network-based requests to provider network 200 via network 260, including requests for storage services (e.g., a request to create, read, write, obtain, or modify data in data storage service(s) 240, a request to perform a file recognition task at data catalog service 220, etc.). For example, a given client 250 may include a suitable version of a web browser, or may include a plug-in module or other type of code module configured to execute as an extension to or within an execution environment provided by a web browser. Alternatively, a client 250 may encompass an application such as a database application (or user interface thereof), a media application, an office application or any other application that may make use of storage resources in data storage service(s) 240 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with provider network 200. In some embodiments, client 250 may be configured to generate network-based services requests according to a Representational State Transfer (REST)-style network-based services architecture, a document- or message-based network-based services architecture, or another suitable network-based services architecture.

In some embodiments, a client 250 may be configured to provide access to provider network 200 to other applications in a manner that is transparent to those applications. For example, client 250 may be configured to integrate with an operating system or file system to provide storage on one of data storage service(s) 240 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 240 may be coordinated by client 250 and the operating system or file system on behalf of applications executing within the operating system environment.

Clients 250 may convey network-based services requests (e.g., access requests directed to data in data storage service(s) 240, operations, tasks, or jobs, being performed as part of other service(s) 230, or to interact with data catalog service 220) to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
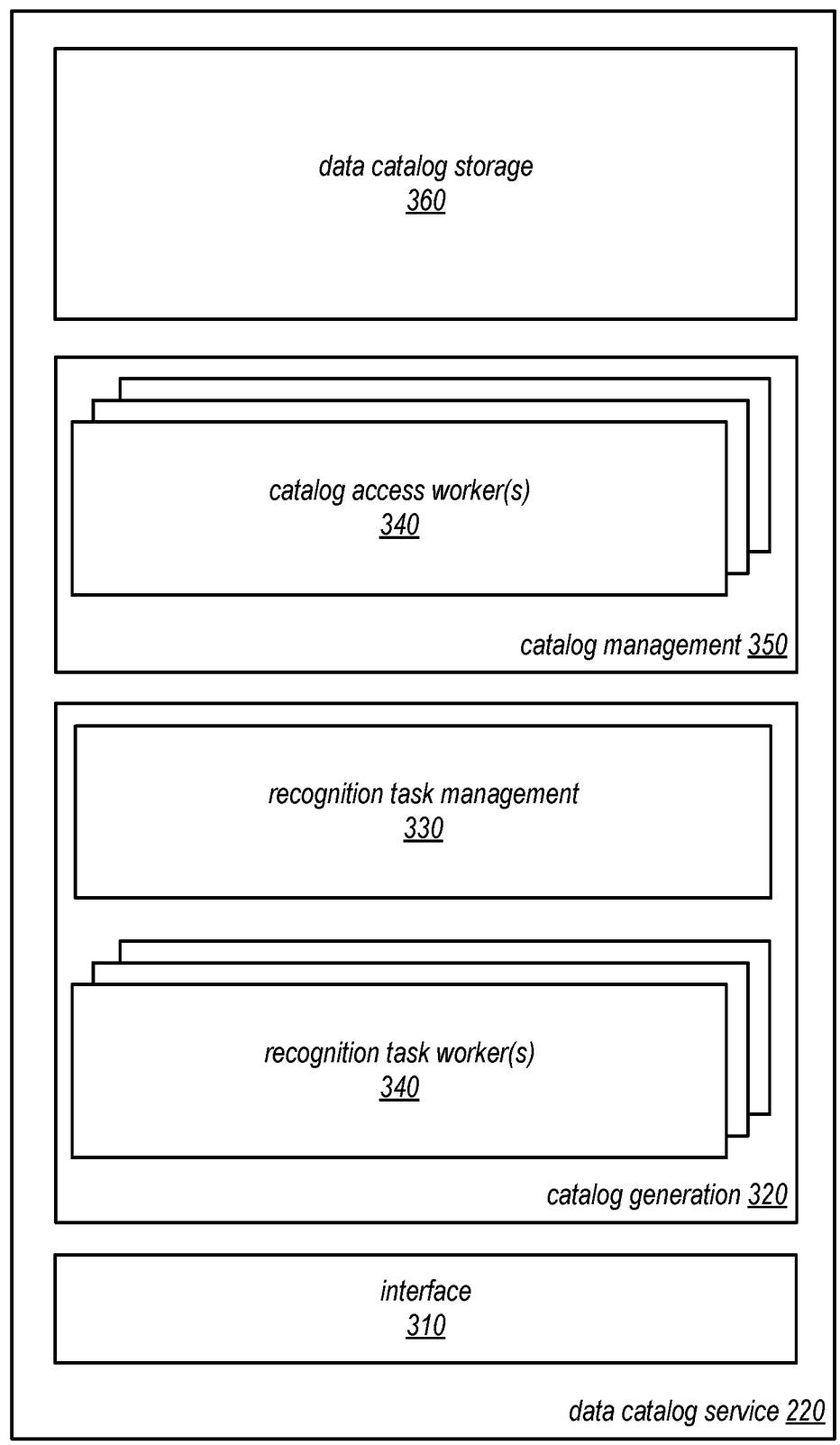
FIG. 3 is a block diagram illustrating a data catalog service that implements recognition of unknown data objects, according to some embodiments.

FIG. 3 is a block diagram illustrating a data catalog service that implements recognition of unknown data objects, according to some embodiments. Data catalog service 220 may maintain data catalogs that are dynamically generated to describe data sets (stored in provider network 200 or in external storage locations) in data catalog storage 360. Data catalog service 220 may provide access to both data catalog storage 360, catalog management 350, and catalog generation 320 via interface 310, which may be a programmatic interface (e.g., Application Programming Interface (API)), command line interface, and/or graphical user interface, in various embodiments.

Data catalog service 220 may implement catalog generation 320 to detect unknown data objects, identify a data schema for the unknown data objects and store the data schema in a data catalog for the unknown data objects in data catalog storage 360, as discussed below with regard to FIG. 4. Catalog generation 320, may implement recognition task management 330 to direct a pool of recognition task workers 340 that may access data sets at multiple different storage locations to perform file recognition tasks. Catalog generation 320 may implement security or authentication controls to ensure that requests for file recognition tasks are submitted by clients associated with an authorized user or account. For example, catalog generation 320 may obtain identification credentials (e.g., username/password) validate them.

Data catalog service 220 may implement catalog management 350 in order to allow for catalog users, owners, or other stakeholders, to modify or otherwise manage data catalogs. For instance, catalog management 350 may implement a pool of catalog access worker(s) to process and execute access requests directed to data catalog storage 360 (e.g., requests to combine, delete, or split tables of metadata in the catalog or edit the metadata determined for a data catalog, or query, search, filter-by or otherwise locate data objects according to the data schema information stored in the data catalogs, as discussed below with regard to FIG. 7). Catalog management 330 may implement access or control policies for data catalogs (e.g., to limit access to a data catalog to authorized users). Catalog management 330 may implement data retention or life cycle policies to determine how long data catalogs (or older versions of data catalogs) are maintained in data catalog storage 360. Catalog management 330 may handle the provisioning of storage resources in data catalog storage 360 for creating new data catalogs (e.g., providing the location of storage resources to catalog generation 320). Catalog management 330 may also perform load balancing, heat management, failure recovery, and other resource management techniques (e.g., implement durability requirements) to ensure the availability of data catalogs for clients.

Data catalog storage 360 may be implemented by one or more storage nodes, services, or computing devices (e.g., system 1000 discussed below with regard to FIG. 9) to provide persistent storage for data catalogs generated by data catalog service 200. Such storage nodes (or other storage components of storage 360) may implement various query processing engines or other request handling components to provide access to data catalogs according to requests received via interface 310 (as discussed below with regard to FIG. 4.). For example, data catalog storage 360 may be implemented as a non-relational database, in one embodiment, that stores data schema, including file types, structure or arrangement of data (or lack thereof), data types (e.g., string, integer, floating point), or any other metadata for data objects in a table. In some embodiments, a collection of metadata for various data objects stored across different storage service(s) 240 on behalf a single user account may be stored together in a single catalog of metadata for user data objects that may be made accessible to clients. For example, to determine which data objects should be loaded into a data analytics engine or service, a query may be sent to data catalog storage 360 to identify data objects in a catalog that include a certain data fields (e.g., user identifier, sales price, location) so that the identified data objects returned as a result of the query can be loaded into the data analytics engine.

Figure 4:
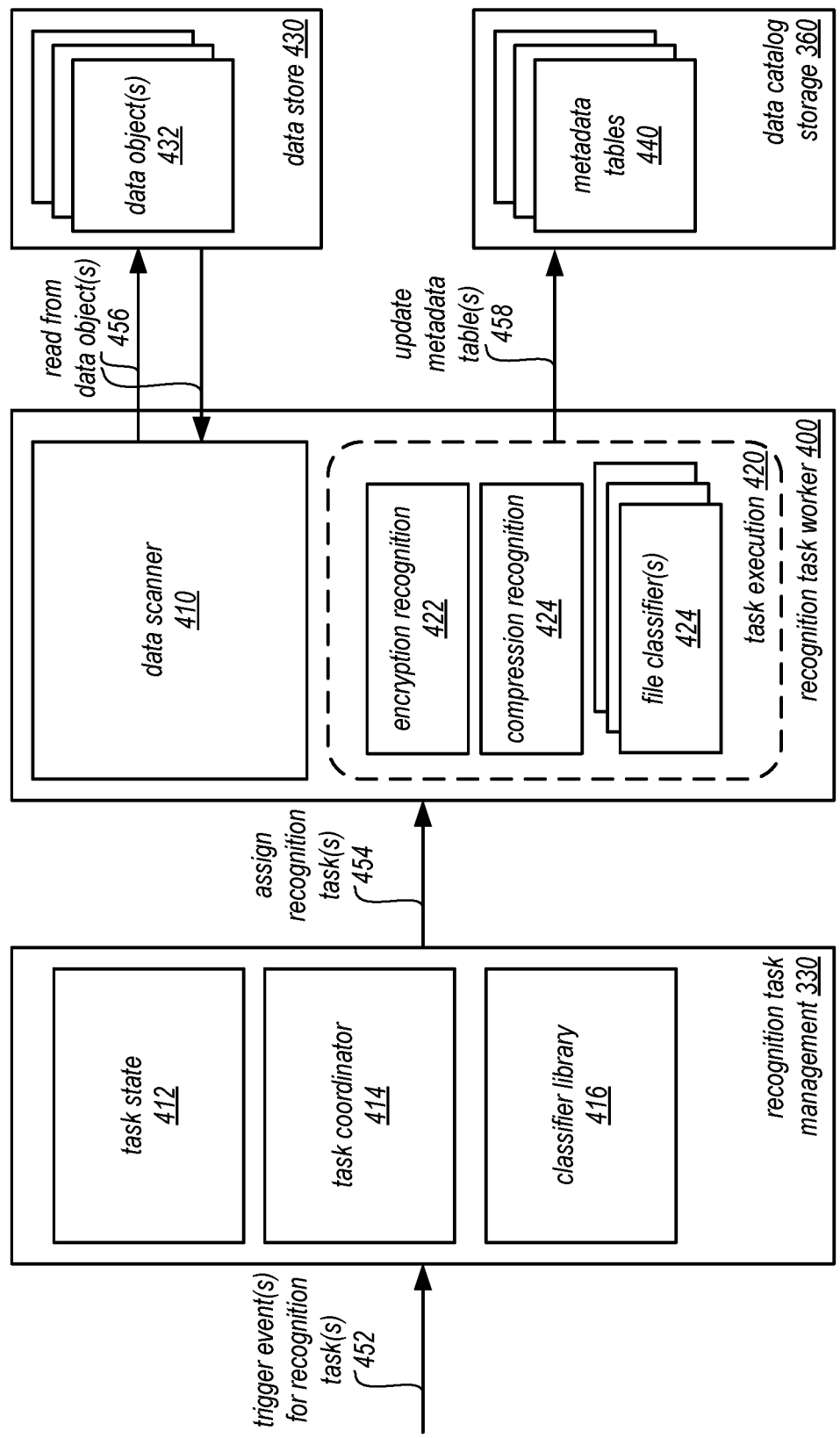
FIG. 4 is a logical block diagram illustrating a recognition task worker, according to some embodiments.

FIG. 4 is a logical block diagram illustrating a recognition task worker, according to some embodiments. As noted above, data catalog service 220 may implement recognition task management 330 to direct the execution of file recognition tasks. As illustrated in FIG. 4, recognition task management 330 may receive recognition task requests 452 which may include various information to perform the recognition task, including access credentials for data objects, classifier(s) to apply, a search location for the file recognition task, a trigger event for the task, and/or an output format for the recognition task as well as various other information discussed with regard to recognition task request 630 in FIG. 6 below, to perform file recognition tasks on behalf of a client of data catalog service 220. In some embodiments, file recognition tasks may be continuously or automatically performed without request or direction. For example, data stores in data storage services 240 may be monitored or polled for new data objects that are stored, triggering the performance of a file recognition task for the data store. A file path or directory index may be scanned for new or unknown data objects, in some embodiments.

Recognition task management 330 may implement task coordinator 414 to schedule or direct the performance of file recognition tasks. For example, in one embodiment task coordinator may maintain a master schedule of file recognition tasks, which identifies when a file recognition task is to be performed. In at least some embodiments, task coordinator 414 may monitor for other trigger event conditions or criteria that trigger the performance of a file recognition task. Failed file recognition tasks or the arrival of new data in a search location for a file recognition task may be detected by task coordinator 414, triggering the execution of a file recognition task.

Task coordinator 414 may assign recognition task(s) 454 to recognition task workers, such as recognition task worker 400. Task coordinator 414 may update task state to indicate that initiation of the file recognition task has begun (e.g., recording a "running" status in task state 412 for the file recognition task) as well as the assigned recognition task worker. In one embodiment, task coordinator 414 may poll recognition task workers for status updates of a task, receive errors or other information from recognition tasks workers, and may determine performance metrics for the execution of an assigned file recognition task, all of which may be maintained in task state 412. Running times, number of unknown objects found, number and type of errors encountered, or any other information describing the execution of the file recognition task may be recorded in task state 412 by task coordinator 454.

Recognition task management 330 may maintain classifier library 416 which may store code, scripts, executables or other definitions, operations, or instructions for classifying different file types. Classifier library 416 may include a common set of classifiers offered to all clients of data catalog service 220. In at least some embodiments, clients may upload or create classifiers at data catalog service 220, which may be maintained in classifier library 416. Client uploaded or created classifiers may be privately utilized in file recognition tasks for user accounts permitted to use the classifiers as described in share rights maintained for the classifiers. In some embodiments, the client uploaded or created classifiers may be made publicly available for use by any client of data catalog service 220.

Recognition task manager 330 may assign 454 a recognition task to task worker 400. The task assignment 454 may include various information for performing the recognition task, such as access credentials for data objects, classifier(s) to apply, a search location for the file recognition task, connection information for the search location, and an output format or location for the file recognition task. Recognition task worker may implement task execution engine or platform 420 to perform the assigned file recognition task. File recognition task worker 400 may implement data scanner 410 to access the search location in data store 430. For example, data scanner 410 may establish a network connection with the data store search location 430 according to access credentials, and connection information provided in the file recognition task request. For example, data scanner 410 may establish a JDBC connection or an iSCSI connection with data store 430 to access data object(s) 432. Data scanner 410 may search for unknown data objects 432 in data store search location 430, and in at least one embodiment, exclude certain paths, locations, or objects from consideration according to exclusion criteria in the file task recognition request. Unknown data objects 432 may be identified by comparing a list of known data objects with the contents found in the search location. If a data object is found that is not known, then it may be detected or identified as an unknown data object 432. Data scanner 410 may read 456 portions from unknown data objects 432 (or the entire data object, in some embodiments) and provide the data to task execution engine 420.

Task execution engine 420 may implement encryption recognition 422, in some embodiments, to determine whether the received portion of the unknown data object is encrypted (e.g., according to symmetric or asymmetric encryption schemes). Encryption recognition 422 may decrypt the portion according to credentials, such as public or private encryption key provided in the file recognition task request. The decrypted portion may then be provided to compression recognition 424, file classifier(s) 426 for further processing.

Task execution engine 420 may implement compression recognition 424 in at least some embodiments. Compression recognition 424 may evaluate the portion from an unknown data object to determine whether a compression technique has been applied and what compression techniques has been applied. For example, compression recognition 424 may scan the portion for a "magic number" or other signature that indicates the compression technique applied to the unknown data object. A data object that is compressed according to the lzip compression scheme may have a hex signature ("4C 5A 49 50") at the start of the data object, for instance, which compression recognition 424 may match with an lzip profile that includes the hex signature for recognizing lzip compressed files.

Task execution 420 may execute one or multiple file classifier(s) 424. File classifier(s) may perform a heuristics-based classification technique and/or a machine learning classification technique, as discussed below with regard to FIGS. 5A and 5B. Different classifier(s) 424 may be specified by a file recognition task request for application. Classifier(s) 424 may be provided from classifier library 416 when the recognition task is assigned 454. File classifier(s) 424 may be performed sequentially (e.g., according to a client specified order) or may be executed in parallel. Classifier results may output confidence scores for the likelihood that the data object is stored according to data schema determined by the classifier. The confidence scores may be evaluated and one data schema selected (e.g., a file type with the highest confidence score). For example, if one classifier can detect the number and names of column values for table structure for an unknown data object but not data types for the columns, then the confidence score associated with the classifier results may be lower than a classifier that determines the number, names, and data types of the columns of the table structure. In one embodiment, at most one classifier may provide a successful classification result, and thus that data schema of the classifier may be identified as the data schema for the data object. In some embodiments, a machine learning classifier may be applied if no heuristic-based classifier is able to provide a successful (or confidence result above a confidence threshold). Task execution engine 420 may update 458 metadata tables 440 in data catalog storage 360 to record the identified file type for the unknown data object(s) 432.

Classifier(s) 424 may include a parser, tuple reader, or other scanner configured to generate interpretations of the data for evaluation. For example, classifier(s) 424 may evaluate parsing results to determine data types (e.g., data type recognition techniques) such as generic data types (e.g., string, integer, floating point, etc.) based on the data types implemented as part of a file type corresponding to a classifier (e.g., some file types implement floats and some file types implement doubles). In at least some embodiments, classifier(s) 424 may evaluate parsing results recognize special data types (e.g., zip codes or geographic coordinates) or user-specified data types (e.g., data structures that include multiple data values of homogenous or heterogeneous data types).

Figure 5A:
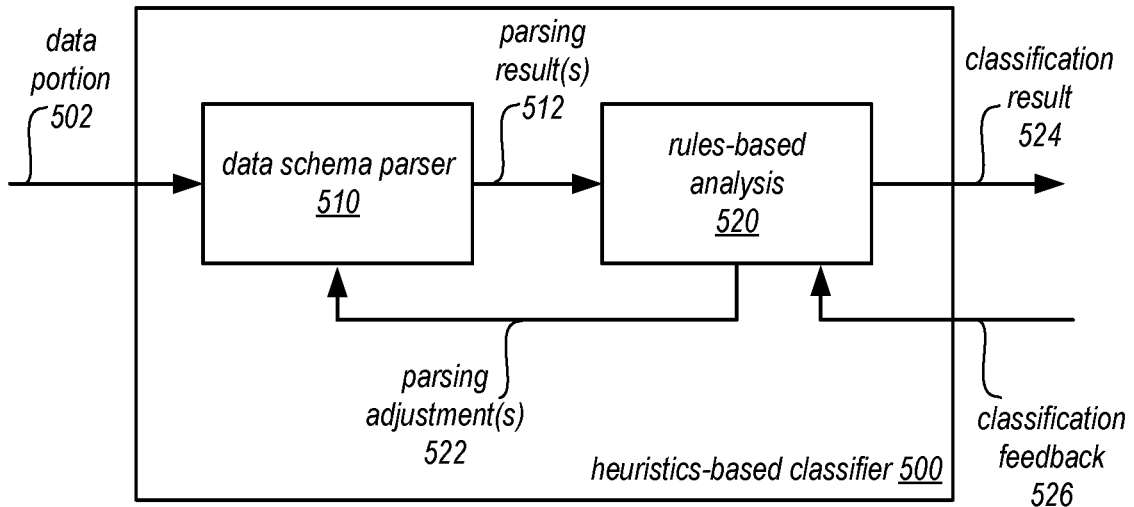
FIG. 5A is a logical block diagram illustrating a heuristics-based classifier, according to some embodiments.

FIG. 5A is a logical block diagram illustrating a heuristics-based classifier, according to some embodiments. Heuristics-based classifier 500 may perform data schema recognition for a specific data schema or family of data schemas (e.g., data schemas stored according to particular file type). Received data portion 502 may be received and parsed by data schema parser 510, which parses data portion 502 under the assumption that it is of the specific data schema (e.g., file type) for the heuristics-based classifier 500. For example, file type parser may parse data portion 502 as if data portion were a comma separated value (CSV) file type. Parsing results 512 may be a parse tree, graph, or other data structure formatted according to the file type specific to the heuristics-based classifier. The generated parsing result(s) 512 may then be analyzed using a rules-based analysis 520. For example, rules-based analysis 520 may operate according to one or more rules that define what information should be present in the parsing result 512 if it is successfully parsed. Rules-based analysis 520 may attempt to read the parsing result 512 in particular locations or ways in order to determine whether parsing result 512 is intelligible according to the specific file type (e.g., by examining the parsing results for signatures, markers, fields, or other characteristics that would be present in a parse result of data that was from a data object of the file type).

Rules-based analysis 520 may examine or evaluate the parsed results 512 to determine the structure, or lack thereof, of the unknown data object(s). For example, unknown data objects may be a file or directory that includes multiple parts (e.g., multiple file objects in the directory, like different partitions of a database table). The structure of the unknown data objects, including sub-directories, may be recognized and used to determine a data schema for the unknown data objects. For example, the root directory may be mapped to a time range (e.g., a month), and respective sub-directories including different file objects may be mapped to different date ranges within the month, so a data schema may be determined that identifies a month and time range for each file object. For other semi-structured or unstructured data, different analysis may be performed to determine data schema. If, for instance, a log file includes a repeating pattern of values for each log record entry, then those repeating values may be mapped to or identified as "column" values of a data schema for the log file.

Rules-based analysis 520 may examine or evaluate the parsed results 512 to determine data types for the data values within a data object. For example, an integer parser, string parser, floating point parser, or other data value techniques may be applied to raw bit values to detect whether one of the results is successfully interpreted as an integer, string, floating point, etc. Specialized data values, such as uniform resource locators (URLs), postal codes, social security numbers, telephone numbers, coordinates, or any other data value type or format may be recognized in similar fashion, applying parsers or interpreters to check whether raw data (or integers, strings, floating point numbers, etc.) are in the specialized data format.

In some embodiments, rules-based analysis 520 may identify determine or whether a difference between an expected value or result within parsing result(s) 512 is an adaptation or extension of a file type. In at least one embodiment, rules-based analysis 520 may make parsing adjustments 522 file type parser 510 (e.g., use two spaces as a delimiter instead of one space) and have the data portion 502 re-parsed based on the parsing adjustments. Rules-based analysis 520 may also be updated based on classification feedback 426, in at least some embodiments. For example, if a particular rule directs the identification of a data value as one data type (e.g., certain values as integers) and the data type is always changed to a different data type (e.g., a floating point), then the rule or heuristic within a rules-based classification model for the classifier may be updated to change the mapping of the data value to the different data type.

Rules-based analysis 520 may determine whether the parsing result(s) 512 were a successful parse of data portion 502 according to the data schema being recognized by data schema parser 510. Rules-based analysis 520 may indicate a success or failure classification result 524 based on the determination. In other embodiments, a confidence score or other indication of the accuracy of the results may be indicated.

Figure 5B:
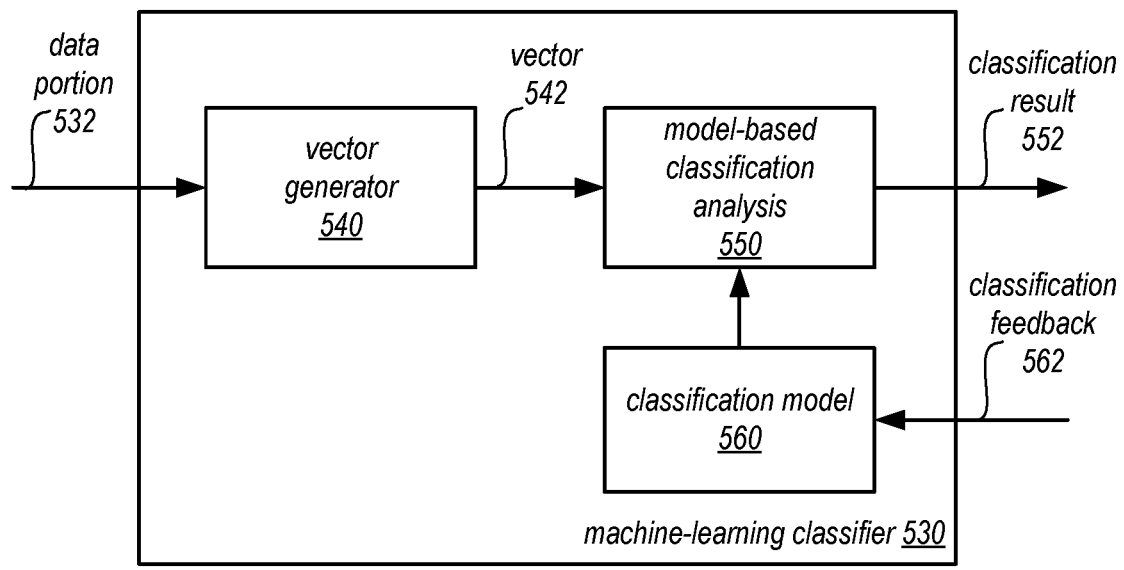
FIG. 5B is a logical block diagram illustrating a machine learning classifier, according to some embodiments.

FIG. 5B is a logical block diagram illustrating a machine learning classifier, according to some embodiments. Machine learning classifier 530 may be implemented as one of file classifier(s) 426 applied by a recognition task worker, such as task worker 400. Machine-learning classifier 530 may implement one or more machine learning techniques to classify a portion of an unknown data object. For example, data portion 532 may be received and vector generator 540 may generate multi-dimensional vector 542 model-based analysis. For example, vector generator 540 may implement a shingled feature generation technique for the vector by taking overlapping ranges of the data object (e.g., bytes 1-20, 10-30, 20-40, and so on) and applying a transformation, such as a hash function to the overlapping ranges, to generate each dimension of the multi-dimensional vector. In a different embodiment, vector generator 540 may locate different features or data within the portion to generate the multi-dimensional vector 542.

Vector 542 may then be analyzed according to a model-based classification analysis 550 that may apply classification model 560 to identify file type that is similar to vector 542. For example, classification model 560 may be applied as a k-nearest neighbor algorithm which classifies vector 542 as a file type based on the nearest k vectors for known file types that are neighbors of vector 542 in classification model 560, in one embodiment. Each neighbor of k vectors can be compared with vector 542, and the majority file type of the nearest k vectors is identified as the file type for vector 542. Other machine learning techniques that apply classification model 560 can be performed in other embodiments, such as a support vector machine technique, k-means clustering technique, or other supervised or unsupervised machine learning techniques. Classification model 560 may be initially trained off-line. In some embodiments, classification model 560 may be updated based on classification feedback 562. For example, if a user manually changes a file type classification to a different file type for a data object, then the classification model 560 may be updated to reflect that the vector generated for that data object is classified as the different file type identified by the user.

Model-based classification analysis 550 may provide a classification result 552, which indicates a file type that is identified or a confidence score that the data object is a file type. Machine learning based classifiers can reduce the number of file type specific classifiers, such as heuristics based classifier 500 that need to be maintained in order to detect the file types. As the number file types may continue to increase, machine-learning classification of file types for unknown data objects may allow new file types to be recognized without having to obtaining specific file type classifiers for the new file types, creating a file recognition system that can recognize a file type without having to perform several other file type specific classification techniques.

Figure 6:
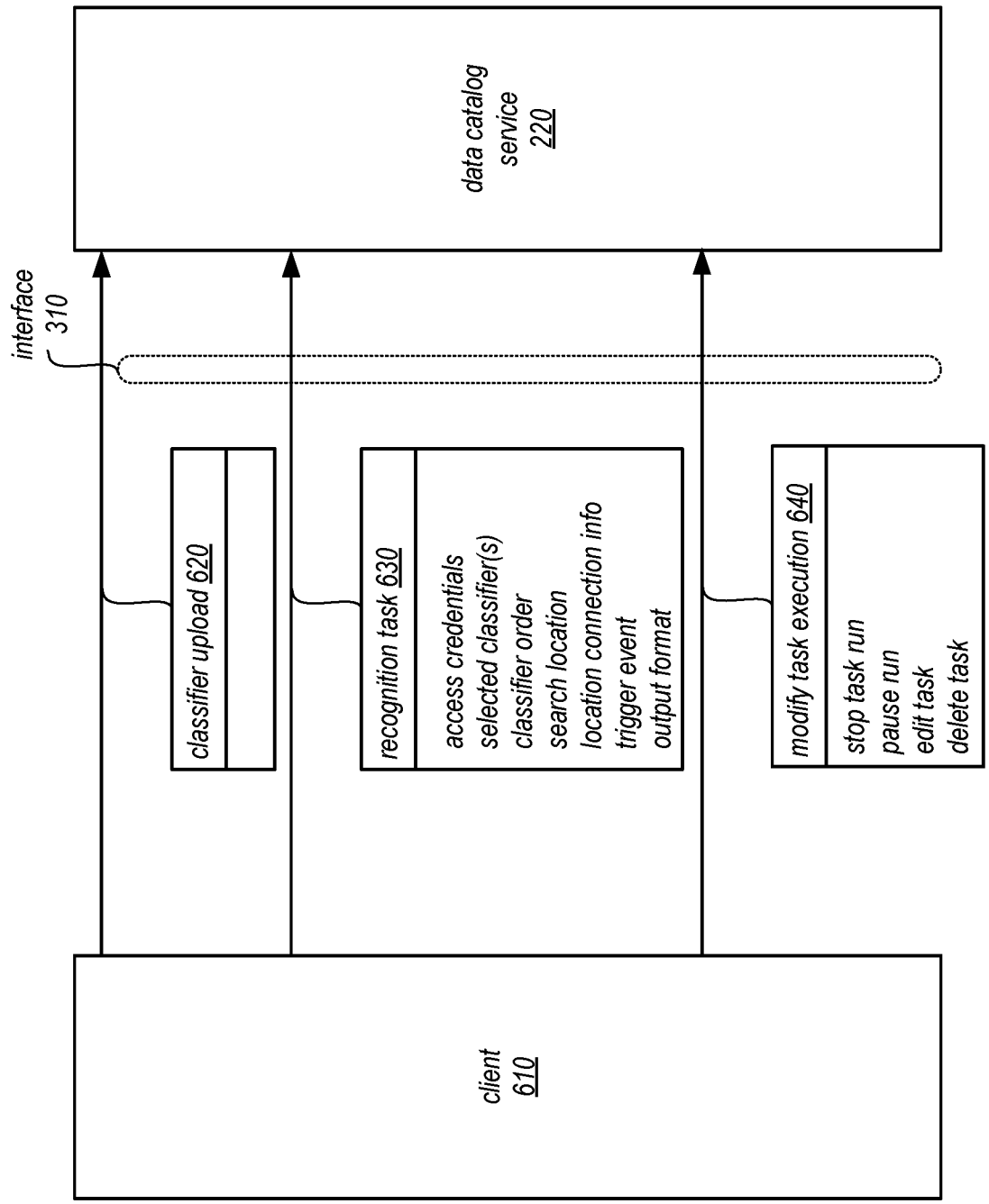
FIGS. 6-7 illustrate example interactions between a client and a data catalog service, according to some embodiments.

FIG. 6 illustrates example interactions between a client of a data catalog service and the data catalog service. Client

610 may be a client similar to client 250 in FIG. 2. Client 610 may submit requests via interface 310. As discussed above, interface 310 may be a graphical user interface (GUI) or programmatic interface (e.g., API) via which clients, like client 610, can submit requests to data catalog service 220. For example, in some embodiments, client 610 can submit a request 620 to upload a classifier 620. The classifier, like classifiers 426 in FIG. 4, may be a script, code, or executable that performs file recognition for one or multiple file types. The uploaded classifier may be stored in maintained as part of a classifier library. As illustrated in FIG. 6, the upload request 620 may specify whether other users may be granted rights to share or implement the classifier for different file recognition tasks. In one embodiment, interface 310 may provide an input interface (e.g., a text editor) for users to write, define, or otherwise create a classifier without having to transfer the classifier via upload request 620.

Client 610 may send a recognition task request 630 via interface 310, in some embodiments. For example, recognition task 630 may specify or configure the execution of the file recognition task. In some embodiments access credentials, user role, or other information may be provided (or pointed to), which data catalog may use to access a data store to search for unknown data objects, access found data objects, and store metadata indicating the results of the file recognition task. In some embodiments, the recognition task request 630 may specify the classifier(s) to apply as part of the file recognition task. Classifier names or identifiers may be included in the request. In some embodiments where interface 310 is a GUI, the classifier(s) may be selected from a drop down list or other display which offers available classifiers, including classifiers that may be used by a user (e.g., as a result of classifier upload or creation by the user or another user that has granted rights to share the classifier). In at least one embodiment, the recognition task 630 may also specify an order in which the classifier(s) are to be applied (e.g., wherein classifiers are serially applied).

Recognition task request 630 may include a search location for the recognition task. For example, a directory, grouping or collection for data objects, a file path or other location descriptor may be included that identifies where a search for unknown data objects should be performed. In some embodiments, excluded locations, paths, or may be defined which exempt or block locations from search for a file recognition task. If, for instance, within an identified directory, a sub-directory contains incomplete or erroneous data objects, the sub-directory may be excluded from a search of the directory for unknown data objects. Connection information may be included, in at least some embodiments, to facilitate the search and access of the search location in the data store for the file recognition task. If, the data store is accessible in virtual private network or group, connection information may be provided to establish a network connection with the network group (e.g., in addition to the access credentials to gain access to the virtual private network). Location connection information may include a network address, server, computer, or storage device identifier, or any other information for establishing a connection to search the location.

The recognition task may also define or specify a trigger event for the recognition task. For example, conditions or criteria that automatically trigger the execution of the file recognition task may be specified. A fixed schedule may be defined for the file recognition task (e.g., every Wednesday at midnight). Some trigger events may include a condition or criteria that is evaluated based on a state of the search location (e.g., accessed since last recognition task performed), the state or results of another file recognition task (e.g., success or failure), or any other condition or criteria that can be evaluated by a task execution coordinator, such as task coordinator 414 in FIG. 4. Recognition task request 630 may specify an output format, in some embodiments. For example, the identification of a catalog or other metadata table maintained in data catalog service 220 or an external storage location for the metadata (e.g., at another service within provider network 200 or a location external to provider network 200).

In some embodiments, client 610 may send a request to modify task execution 640. For example, a currently running or executing file recognition task may be stopped (although the file recognition task may not be stopped from subsequently executing in response to a trigger event for the file recognition task). A currently running or executing file recognition task may be paused (e.g., in order for an error or result of the file recognition task to be investigated). The file recognition task may be later resumed or stopped. Modify task execution request 640 may edit a file recognition task, including changing or modifying access credentials, selected classifier(s), the ordering of classifiers, search location, location connection information, trigger event, or output format. In some embodiments, modify task execution 640 may delete a file execution task.

Figure 7:
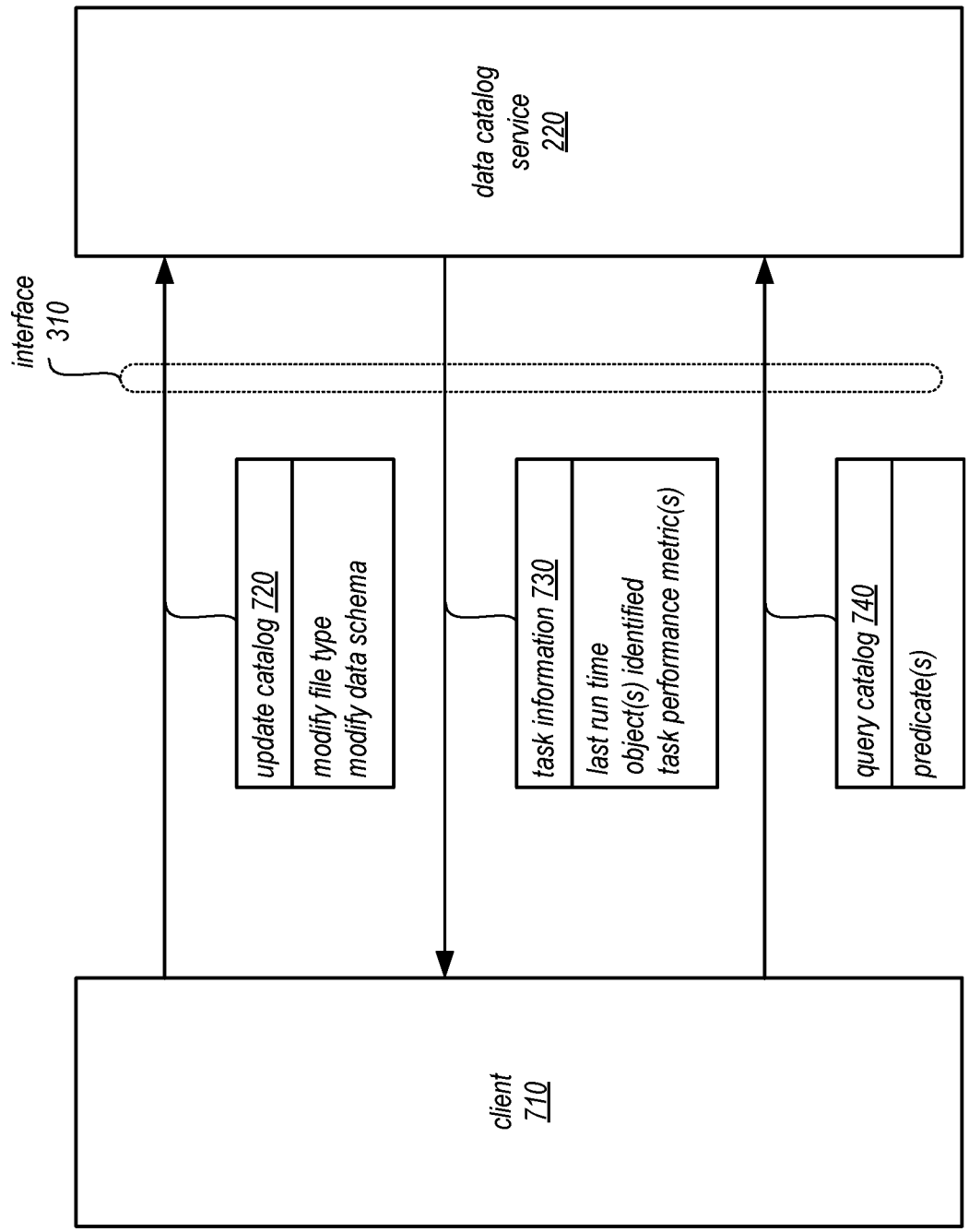

FIG. 7 illustrates further interactions between a client and data catalog service. Client 610 may send a request for task information 720 for a specified file recognition task (e.g., by including a file recognition task name or identifier). For example, task information request 730 may include task history, such as a last time the file recognition task was performed. The task information may include a listing of object(s) found or identified, in some embodiments. For example, a file path or other locator for found objects as well as a name and identified file type may be provided. In some embodiments, task performance metric(s) may be provided. For example, task execution time (e.g., in minutes) may be included along with other metrics, such as average execution time for the task, amount of data discovered or found, error rate or any other capture performance metric for the file recognition task.

In addition to interacting with file recognition tasks, clients, such as client 610 may access the created data catalogs to retrieve metadata. As illustrated in FIG. 7, in a least some embodiments, a request to update the catalog 720 may be received that modifies an identified file type (e.g., change from an ORC file type to a Parquet file type). Update catalog request 720 may include, in some embodiments, a modification to other data schema collected for a data object. For example, the data type of a column or name of a column may be changed.

In some embodiments, client 610 may send a request 740 to query a data catalog. The query may include one or multiple query predicates. For example, a query 740 may include predicates that return all data objects that include data values that span a time range. Data catalog service 220 may process the query with respect to the data catalog by evaluating the time range values found for the different data objects, and return a listing of those data objects that are indicated as storing data values within the time range (e.g., by identifying those data objects with a data schema indicating that a particular column, filed, attribute, directory, etc., stores data within the time range).

Note that while client 610 is illustrated as performing the different interactions, different clients could perform the requests with respect to the same file recognition task or catalog.

Figure 8:
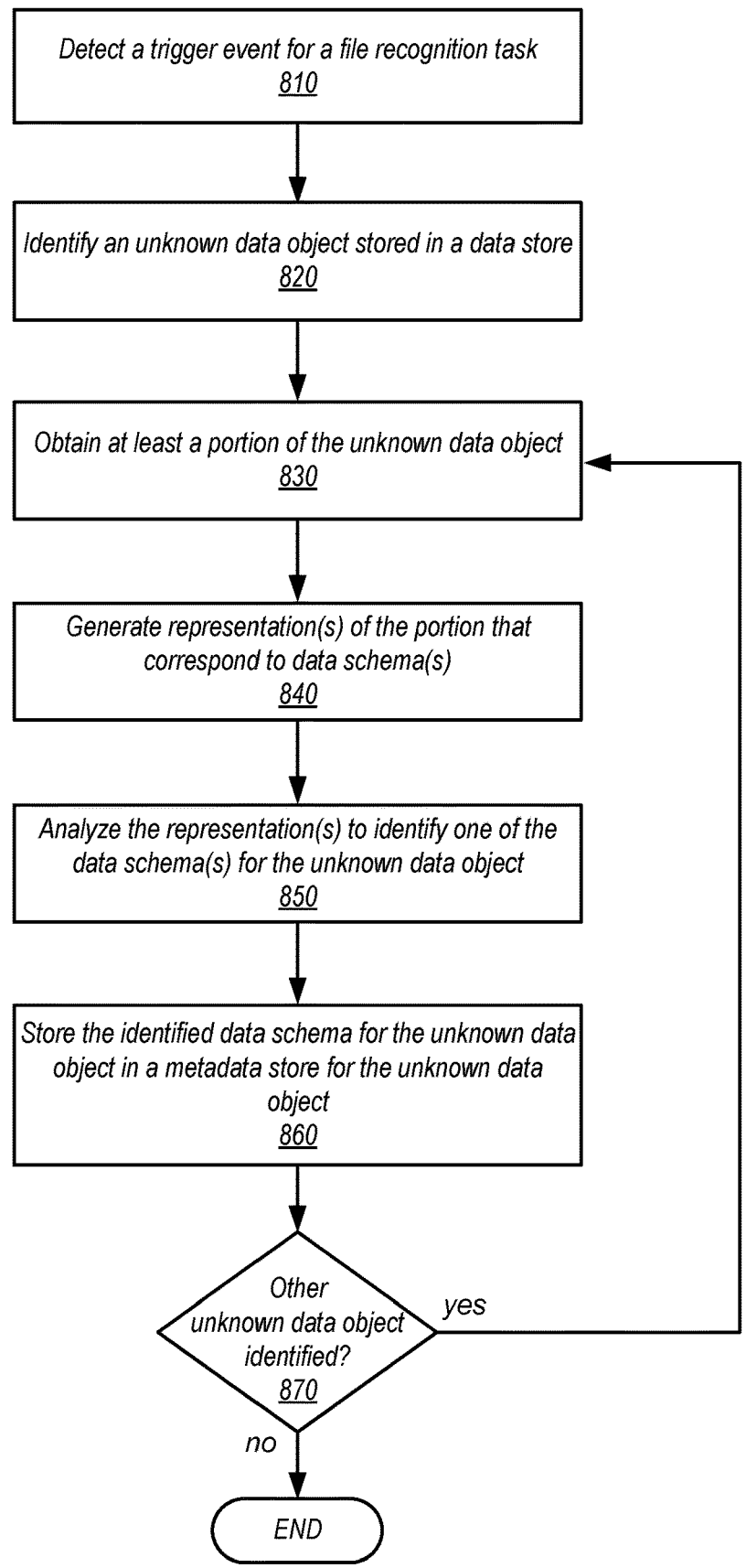
FIG. 8 is a high-level flowchart illustrating methods and techniques to implement recognizing unknown data objects, according to some embodiments.

Although FIGS. 2-7 have been described and illustrated in the context of a data catalog service, the various techniques and components illustrated and described in FIGS. 2-7 may be easily applied to other data access or management systems in different embodiments that may recognize unknown data objects stored in a data store. As such, FIGS. 2-7 are not intended to be limiting as to other embodiments of a system that may implement recognition of unknown data objects. FIG. 8 is a high-level flowchart illustrating methods and techniques to implement recognizing unknown data objects, according to some embodiments. Various different systems and devices may implement the various methods and techniques described below, either singly or working together. For example, a data catalog service such as described above with regard to FIGS. 2-7 may be configured to implement the various methods. Alternatively, a combination of different systems and devices, such as a storage subsystem that manages access to data stored in directly attached storage devices. Therefore, the above examples and or any other systems or devices referenced as performing the illustrated method, are not intended to be limiting as to other different components, modules, systems, or configurations of systems and devices.

As indicated at 810, a trigger event may be detected for a file recognition task. For example, trigger events may be determined according to chronological criteria, such as a schedule. Trigger events may, in one embodiment, be specified by a particular day of the week, day in a month, as well as by a particular time. Trigger events, may include conditions or criteria based on the state of a data store or a previously performed operation. The arrival of new data, for example, may trigger a file recognition event, in an embodiment. Trigger events may include multiple conditions, such as both a chronological condition and a state condition (e.g., perform a file recognition task each Monday if the file recognition task did not detect any unknown data objects the previous Friday). Trigger events may be manually invoked, such as by a request to run, execute, or otherwise start a file recognition task.

In some embodiments, trigger events may identify the type or operations to be performed as part of a file recognition task. A file recognition task may include applying a specified set of classifier(s), as discussed above with regard to FIG. 6, that are to be applied in order (e.g., of likelihood). Trigger events may determine other characteristics or parameters of a file recognition task. For example, in one embodiment a trigger event may specify a location to store recognition tasks results and a communication method to perform in order to provide a notification of the results of the file recognition task. Various other configurations of file recognition tasks may be invoked by a trigger event, such as the different examples discussed above with regard to FIGS. 5A-7, in some embodiments.

As indicated at 820, an unknown data object stored in a data store may be identified. For example, a manifest, list, index, directory, or other data describing the content of a location within a data store (or within the entire data store) may be compared with an older version of the manifest, list, index, directory, or other data describing the location. For those data objects that are present in the current manifest but not present in the previous manifest, the data objects may be marked, tagged, or otherwise considered unknown data objects. In some embodiments, an unknown data object may be a partition of or embedded within another data object which may be already known. For example, a partition of database table that has already been recognized may be found in the data store. For those unknown data objects that are found and determined to be associated with a known data object, the file type of the known data object may be selected for the associated unknown data objects, removing the associated unknown data objects from further analysis (according to elements 830-850). Instead, the identified file type for the associated data objects may be stored in a metadata store for the unknown data objects (as discussed below at element 860).

As indicated at 830, at least a portion of the unknown data object may be obtained, in various embodiments. For example, a bit or byte range of data for the unknown data object may be read, scanned, or otherwise requested from the data store. In one embodiment, the entire data object may be retrieved (e.g., if the data object is smaller than a sample threshold for file recognition).

The unknown data object may be encrypted, in some embodiments. The trigger event may include or direct the obtainment of access credentials (e.g., encryption keys) to decrypt the portion (or entire) unknown data object. For instance, a private key may be provided by a user requesting or scheduling the trigger event for the file recognition task which can be applied to generate a decrypted version of the portion of the unknown data object using an asymmetric encryption schema.

The unknown data object may be compressed, in some embodiments. The trigger event may identify a compression schema (e.g., bzip or Lempel-Ziv) for the unknown data object, for example. However, in some embodiments, the unknown data object may be evaluated to determine whether a compression schema is applied to the unknown data object and what the compression schema is. For example, in one embodiment, a prefix, header, or other portion of the unknown data object (which may or may not be the same as the portion obtained at 830) may be scanned for a "magic number" or other digital signature identifying the compression schema. In some embodiments, decompressing the data according to multiple different compression schemas may attempt to determine if one of the attempts produces a readable portion of data. Once the compression schema is determined, the portion of the unknown data object (obtained at 830) may be decompressed according to the determined decompression schema.

Once obtained (and possibly decrypted and/or decompressed as noted above), the portion of the unknown data object may be used to generation representation(s) of the portion that correspond to one or more data schemas. For example, as discussed above with regard to FIGS. 4-5A, one or more classifiers that perform rules-based analysis of generated representations may be applied that attempt to parse the portion of the data object according to a corresponding data schema. A parsing technique for Optimized Row Columnar (ORC) format file types, for example, may be applied to generate a parse tree, graph, or other output that may be evaluated for file recognition. Multiple parsing techniques may be applied in parallel, in one embodiment, while in another embodiment parsing techniques may be applied in serial fashion to generate representations for analysis (e.g., according to an order specified in the trigger event). In addition to or instead of applying classifiers, machine learning techniques may be applied to generate a multi-dimensional vector for machine learning analysis, such as the shingling vector generation technique discussed above with regard to FIG. 5B. Other vector generation techniques or other data structures that profile or otherwise represent the portion of the unknown data object for machine-learning analysis may be performed, in different embodiments. For example, one or more features (e.g., size, header fields, etc.) of the portion of the unknown data object may be determined as the representation of the portion and analyzed.

As indicated at 850, the representation(s) may be analyzed to identify one of the data schema(s) for the unknown data object. For example, in embodiments where classifiers are applied to the portion, the results of one or multiple classifiers may be compared, such as success or failure indications or confidence scores for the file type corresponding to an applied parsing technique for the classifier. The data schema of the classifier that was successful or has the highest confidence score may be selected as the identified file type for the data object. In some embodiments, representations may be analyzed individually, until a first success result or confidence score over a selection threshold (e.g., 90%) is determined. In such embodiments, not all classifiers need be applied to determine the identification of the data schema for the unknown data object.

In those embodiments that implement a machine-learning based file type recognition analysis, the vector or other type of representation of the data object may be evaluated with respect to a file type recognition model. For example, in applying a support vector machine learning technique, a file classification model trained with previous vectors classified as different file types may be used to identify a data schema for the vector. Note that in different embodiments, other machine learning techniques may be applied, such as support vector clustering analysis, k-means clustering analysis, or any other classification machine learning technique, and thus the previous example is not intended to be limiting. In some embodiments, if the analysis of representations generated using classifiers are unsuccessful, then a machine-learning based file recognition technique may be performed.

As indicated at 860, the identified data schema for the unknown data object may be stored in a metadata store for the unknown data object. For example, the metadata store may be a separate data storage system or service (e.g., like data catalog service 220) which may maintain metadata describing data objects separate from the data objects. In some embodiments, a directory, index, mapping information, or other metadata store located in the data store storing the unknown data object may be updated to include the file type for the unknown data object. As discussed above with regard to FIG. 4, the stored data schema may include information, such as the number of columns, column names, column names or other item data types (e.g., such as generic item types including integer, string, or floating point or specially defined data types, including gender, zip code, or animal picture) as part of the data schema for the unknown data object.

As indicated at 870, in some embodiments a file recognition task may continue to search the location specified by the event trigger for other unknown data objects. If no other unknown data objects are found, then as indicated by the negative exit from 870, the file recognition task may end. A notification of found and recognized file data objects may be sent or reported (e.g., as specified by the event trigger). For example, an email report, or other message, may be sent summarizing the successful or unsuccessful attempts to classify found unknown data objects. In some embodiments, a task history store or state may be updated to reflect task completion. If, as indicated by the positive exit another unknown data object is identified, then the technique may be repeated starting at element 830 to identify a data schema for the additional unknown data object.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
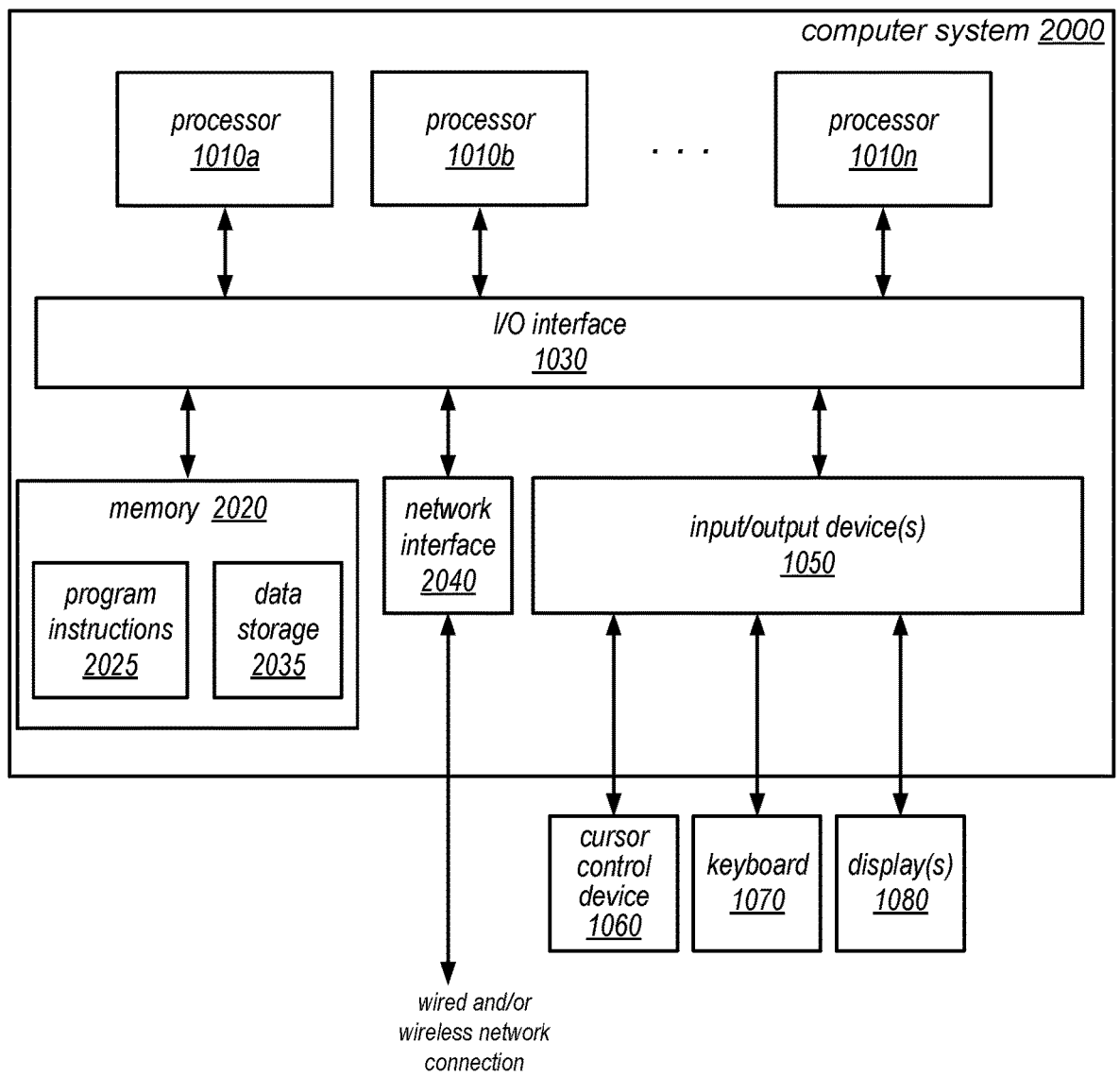
FIG. 9 illustrates an example system configured to implement the various methods, techniques, and systems described herein, according to some embodiments.

Embodiments of recognizing unknown data objects as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, compute nodes within a data catalog system may present data catalog services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory to store program instructions that, if executed, cause the at least one processor to perform a method, including:
   identifying an unknown data object in an unknown data schema that is stored in a data store;
   obtaining at least a portion of the unknown data object;
   parsing the portion according to different ones of a plurality of data schemas to generate different representations of the portion that correspond to respective ones of the plurality of data schemas;
   analyzing respective success of the representations generated from the different data schemes to identify one of the different data schemas as the data schema for the unknown data object; and
   storing the identified data schemas for the unknown data object in a metadata store for the unknown data object.

2. The system of claim 1,
   wherein analyzing the respective success of the representations generated from the different data schemes to identify one of the different data schemas comprises identifying a data schema of a representation classified as a successfully parsed one of the representations as the identified data schema.

3. The system of claim 1,
   wherein analyzing the respective success of the representations generated from the different data schemes to identify one of the different data schemas comprises applying one or more machine learning techniques to the representations to classify the representations as data of the identified data schema.

4. The system of claim 1, wherein the data store is a data storage service implemented as part of a provider network, wherein the at least one processor and the memory are implemented as part of data catalog service in the provider network, wherein the metadata data store is implemented as part of the data catalog service, and wherein the method further comprises:
   receiving a request to access the metadata store for the unknown data object via a network-based interface for the data catalog service; and
   providing the data schema of the unknown data object via the network-based interface in response to the request.

5. A method, comprising:
   identifying an unknown data object in an unknown data schema that is stored in a data store;
   obtaining at least a portion of the unknown data object;
   parsing the portion according to different ones of a plurality of data schemas to generate different representations of the portion that correspond to respective ones of the plurality of data schemas;
   analyzing respective success of the representations generated from the different data schemes to identify one of the different data schemas as the data schema for the unknown data object; and
   storing the identified data schema for the unknown data object in a metadata store for the unknown data object.

6. The method of claim 5, further comprising:
   determining a compression scheme for the unknown data object; and
   decompressing the portion of the unknown data object according to the determined compression scheme.

7. The method of claim 5, further comprising determining data file type for the unknown data object, wherein the file type is stored along with the data schema in the metadata store for the unknown data object.

8. The method of claim 5, further comprising:
   receiving a request to change the data schema for the unknown data object; and
   update the data schema in the metadata store according to the request.

9. The method of claim 5,
wherein analyzing the respective success of the representations generated from the different data schemes to identify one of the different data schemas comprises identifying a data schema of a representation classified as a successfully parsed one of the representations as the identified data schema.

10. The method of claim 5, wherein the method is performed by a data catalog service, wherein parsing the portion according to different ones of the data schemas to generate the representations, comprises applying a plurality of parsing techniques associated with the data schemas, wherein at least one of the different parsing techniques, wherein a first parsing technique is offered as part of the data catalog service, and wherein a second parsing technique is received from a client of the data catalog service.

11. The method of claim 5, wherein analyzing the representations to identify one of the data schemas comprises applying one or more machine learning techniques to the representations to classify the representations as data of the identified data schema.

12. The method of claim 11, further comprising:
receiving one or more modifications to the identified data schema for the unknown data object;
updating a classification model for applying the one or more machine learning techniques to the representations according to the different ones of the data schemas; and
applying the updated classification model to direct the parsing of another portion of another unknown data object to generate representations for identifying a data schema of the data schemas for the other unknown data object.

13. The method of claim 5, wherein the data store is a data storage service implemented as part of a provider network, wherein the method is performed by a data catalog service in the provider network, wherein the metadata data store is implemented as part of the data catalog service, and wherein the method further comprises:
receiving a request to access the metadata store for the unknown data object via a network-based interface for the data catalog service; and
providing the data schema of the unknown data object via the network-based interface in response to the request.

14. A non-transitory, computer-readable storage medium, storing program instructions that when executed by one or more computing devices cause the one or more computing devices to implement:
identifying an unknown data object in an unknown data schema that is stored in a data store;
obtaining at least a portion of the unknown data object;
parsing the portion according to different ones of a plurality of data schemas to generate different representations of the portion that correspond to respective ones of the plurality of data schemas;
analyzing respective success of the representations generated from the different data schemas to identify one of the different data schemas as the data schema for the unknown data object; and
storing the identified data schema for the unknown data object in a metadata store for the unknown data object.

15. The non-transitory, computer-readable storage medium of claim 14, wherein the program instructions cause the one or more computing devices to further implement:
determining a compression scheme for the unknown data object; and
decompressing the portion of the unknown data object according to the determined compression scheme.

16. The non-transitory, computer-readable storage medium of claim 14, wherein, in analyzing the respective success of the representations generated from the different data schemas to identify one of the different data schemas, the program instructions cause the one or more computing devices to implement applying one or more machine learning techniques to the representations to classify the representations as data of the identified data schema.

17. The non-transitory, computer-readable storage medium of claim 14,
wherein, in analyzing the respective success of the representations generated from the different data schemas to identify one of the different data schemas, the program instructions cause the one or more computing devices to implement identifying a data schema of a successfully parsed one of the representations as the identified data schema.

18. The non-transitory, computer-readable storage medium of claim 17, wherein the program instructions cause the one or more computing devices to further implement:
receiving one or more modifications to the identified data schema for the unknown data object;
updating a rules-based classification model for directing the parsing of the portion according to different ones of the data schemas; and
applying the updated rules-based classification model to direct the parsing of another portion of another unknown data object to generate representations for identifying a data schema of the data schemas for the other unknown data object.

19. The non-transitory, computer-readable storage medium of claim 14,
wherein the method is performed by a data catalog service;
wherein, in parsing the portion according to different ones of the data schemas to generate the representations, the program instructions cause the one or more computing devices to implement applying a plurality of parsing techniques associated with the data schemas, wherein the plurality of parsing techniques are applied according to an ordering specified in a request received from a client of the data catalog service.

20. The non-transitory, computer-readable storage medium of claim 14, wherein the program instructions cause the one or more computing devices to further implement:
detecting a classification event for the unknown data object; and
in response to detecting the classification event, performing the generating of the representations, the analyzing of the representations, and the storing of the data schema.

* * * * *